United States Patent

Shevlin

[15] 3,666,921
[45] May 30, 1972

[54] APPARATUS AND METHOD FOR PULSE COOKING AND HEATING

[72] Inventor: Thomas S. Shevlin, White Bear Lake, Minn.

[73] Assignee: Minnesota Mining and Manufacturing Company, Saint Paul, Minn.

[22] Filed: Sept. 26, 1968

[21] Appl. No.: 762,913

[52] U.S. Cl. ........................... 219/492, 219/385, 219/386
[51] Int. Cl. ........................................................ H05b 1/02
[58] Field of Search ........................ 99/332, 325, 326, 335; 219/492, 494, 438, 501, 480, 486, 482, 493, 385, 386; 307/133

[56] References Cited

UNITED STATES PATENTS

| | | | |
|---|---|---|---|
| 2,841,680 | 7/1958 | Tuttle | 219/493 |
| 2,917,988 | 12/1959 | Harris | 219/493 X |
| 3,100,711 | 8/1963 | Eisler | 219/386 X |
| 3,296,415 | 1/1967 | Eisler | 219/385 |
| 3,445,630 | 5/1969 | Ulam | 219/438 |
| 3,509,322 | 4/1970 | Lundin | 219/492 X |
| 3,573,430 | 4/1971 | Eisler | 219/386 X |
| 3,289,570 | 12/1966 | Smith | 99/332 |
| 3,010,006 | 11/1961 | Schwaneke | 219/438 |
| 3,036,188 | 5/1962 | Ditto | 219/492 |
| 3,092,704 | 6/1963 | Woody et al | 219/438 |
| 3,266,661 | 8/1966 | Dates | 219/438 |

FOREIGN PATENTS OR APPLICATIONS 794,081   9/1968   Canada

*Primary Examiner*—Bernard A. Gilheany
*Assistant Examiner*—F. E. Bell
*Attorney*—Kinney, Alexander, Sell, Steldt & Delahunt

[57] ABSTRACT

This invention is directed to a low thermal inertia heating system for pulse heating a preselected quantity of food or other materials. Pulsations of heat are produced and controlled by timing means so that a predetermined amount of heat can be generated in a predetermined heating period. Each pulsation of heat is followed by a predetermined time interval during which no power is applied allowing the heat to be absorbed or diffused in the food or material. The pulse intervals are controlled by the timing means so that the amount of heat required to cook or heat the food or material can be precisely metered and/or programmed.

17 Claims, 9 Drawing Figures

PATENTED MAY 30 1972 3,666,921
SHEET 1 OF 3
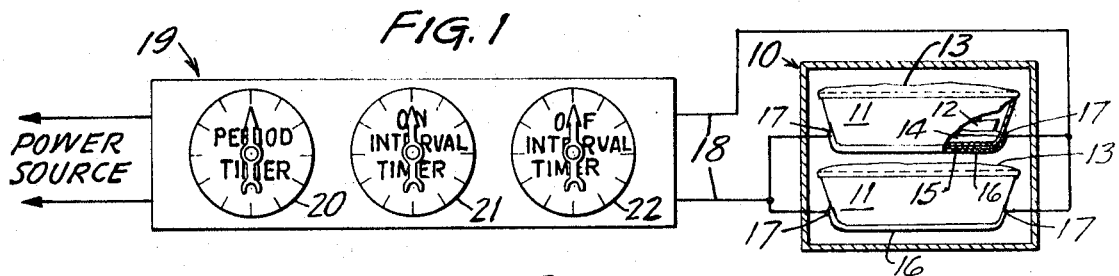
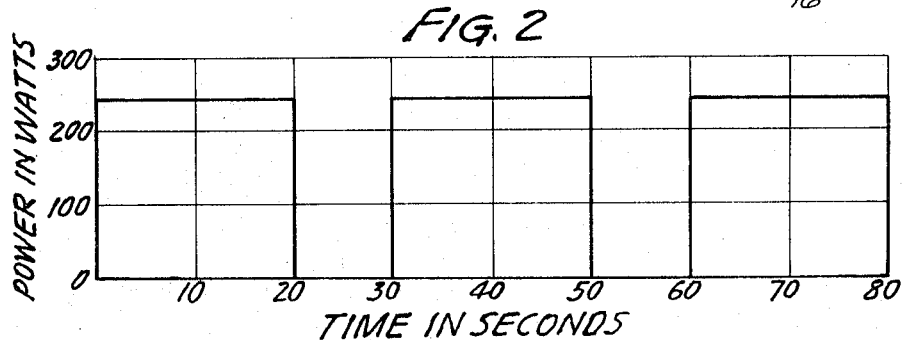
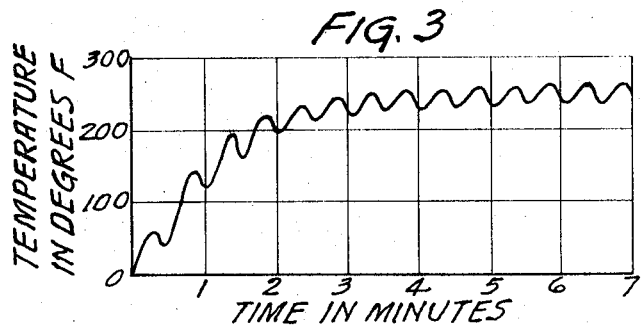
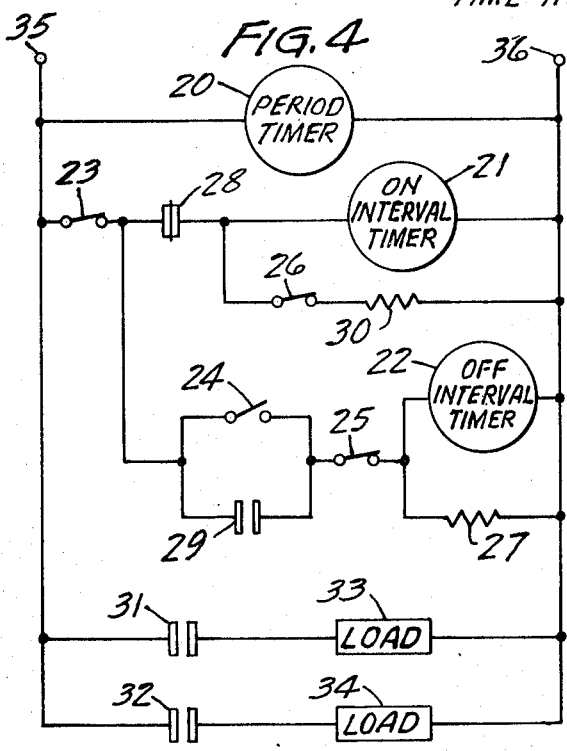
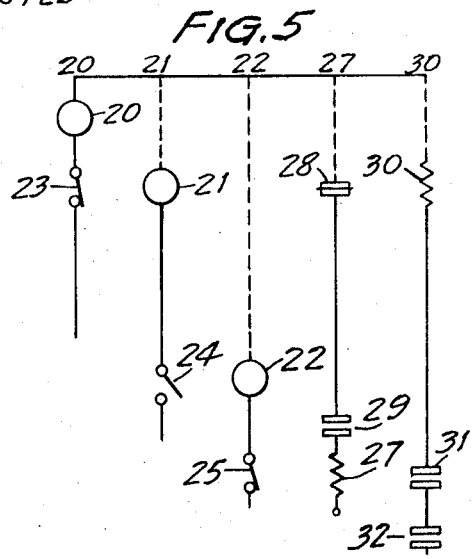
INVENTOR.
THOMAS S. SHEVLIN
BY Kinney, Alexander,
Sell, Steldt & DeLaHunt
ATTORNEYS

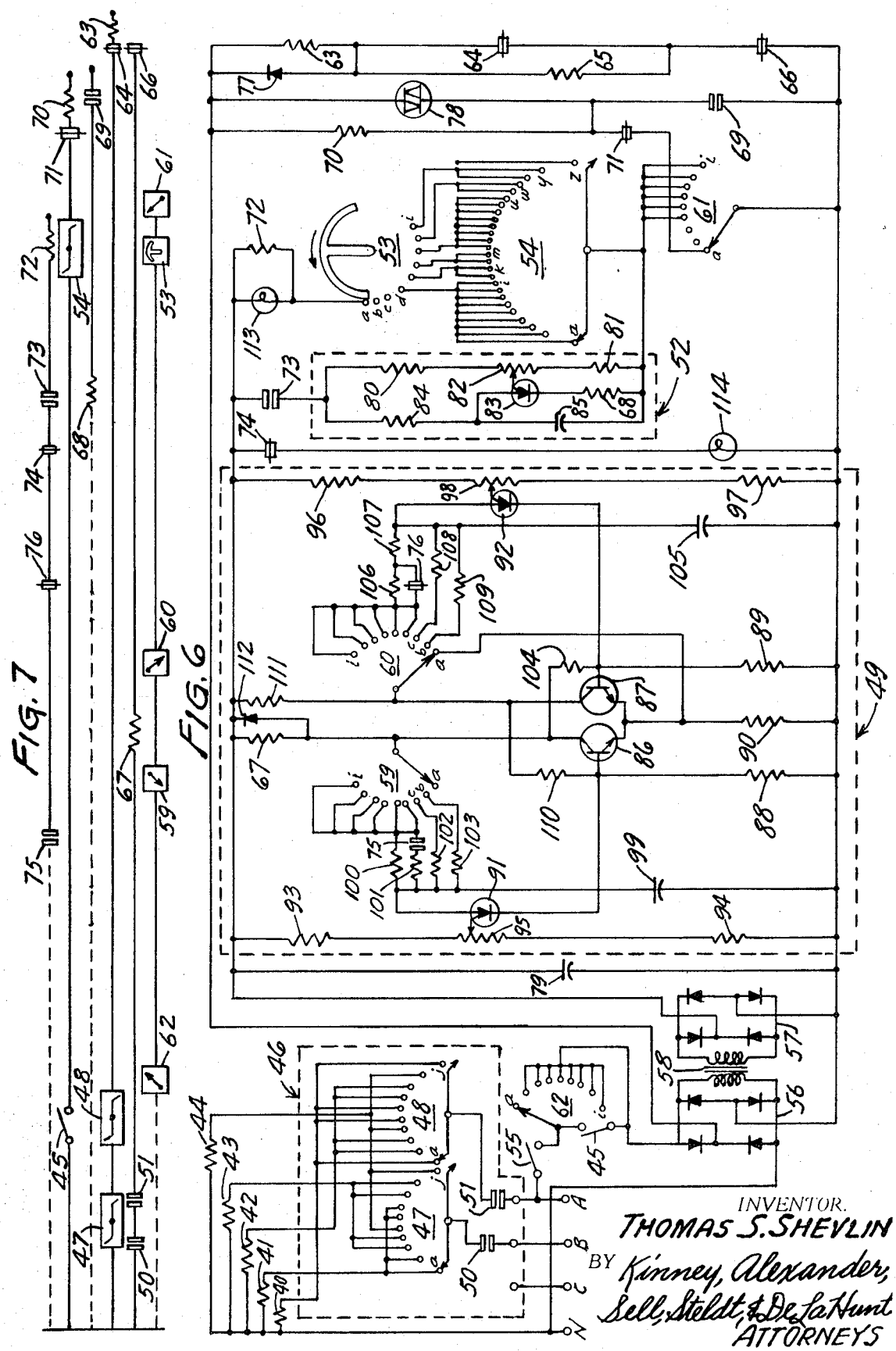

INVENTOR.
THOMAS S. SHEVLIN

APPARATUS AND METHOD FOR PULSE COOKING AND HEATING

In general, most prior art devices cook or heat foodstuffs or other materials by applying relatively even heat throughout a heating period. The amount of heat is usually controlled by applying constant heat for a certain time or by controlling the application through temperature controls such as thermostats, thermocouples, etc. In the latter case, the temperature of the material being heated is allowed to fluctuate during random time intervals because of ambient temperature effects, thermal mass, etc. Additionally, most prior art heating systems utilize ovens which have significantly high thermal barriers and thus a relatively low thermal efficiency. These systems require a considerable amount of heat to overcome the barrier and properly cook or heat the foodstuffs or material.

The present invention utilizes a fast thermal response system to apply a relatively high quantity of heat to food or other material by a series of heat pulses or "on" intervals generated preferably by electrical pulses. Each pulse is followed by an "off" interval during which no thermal energy is applied. Although the quantity of heat applied during each pulse of heat is substantial and would exceed the scorching temperature of the food or material if applied continuously during the heating period, the off interval allows the heat to be absorbed and diffused so that the temperature of the food or material per se always remains below its scorching temperature. By this system more thermal energy can be introduced in a given time without scorching or thermal damage. The minimum total cooking or heating period may thus be reduced.

In utilizing the system, the quantity of food, total heat required, the on and off intervals and total cooking or heating period are all predetermined. By controlling these factors, the electrical energy necessary for heating or cooking can be precisely programmed into the system for accurate and efficient heating without the necessity of thermostats, thermocouples, etc.

Heat is produced by passing an electrical current through a resistor connected to a circuit incorporating a timing system for pulse energizing the resistor in desired time intervals and for controlling the overall time period for heating or cooking. By changing the resistance of the resistor and selecting the voltage applied to it, the amount of heat supplied to cook or heat food or materials in a given time period can be controlled.

The invention preferably utilizes cooking receptacles of low heat capacity which incorporate an integral resistor thereby reducing thermal barriers between the food and heat source. Since the heat source is integrally associated with the cooking or heating receptacles, the system is highly responsive to each pulse of heat thus passing substantially all of the heat into the food or material.

Pulse heating under the controlled conditions of the system prevents scorching, burning or other thermal damage of even the most delicate foods or materials as the required heat can be programmed on a predetermined basis. Food moisture vaporized during the pulsations is condensed during the off time intervals. The condensation transfers heat to the food and preserves the natural moisture of the foodstuffs. The system may be controlled by various timing circuits so that several cooking receptacles can be energized in simultaneous intervals. Additionally, energization of several receptacles may be in any combination or sequence if it is desired to consume relatively constant levels of electrical power, thereby allowing the system to be used in applications where limited amounts of power are available.

DESCRIPTION OF THE DRAWINGS

FIG. 1 is a schematic view of an exemplary pulse heating system showing a timing apparatus connected with a series of heating receptacles;

FIG. 2 is a graph showing the duration of "on" and "off" time intervals used in conjunction with an exemplary application of electric power;

FIG. 3 is a graph showing a typical temperature curve over a period of time during which pulses thermal energy is applied to an exemplary heating application;

FIG. 4 is a schematic diagram of a control system which can be utilized by the heating system of FIG. 1;

FIG. 5 is a key diagram to show the interconnection of the switching elements in FIG. 4;

FIG. 6 is a schematic diagram showing a system for controlling the distribution of electric energy in a predetermined sequence from two phases of a three phase AC power source to five loads or receptacles;

FIG. 7 is a key diagram to show the interconnection of the switching elements of FIG. 6;

Figure 8:
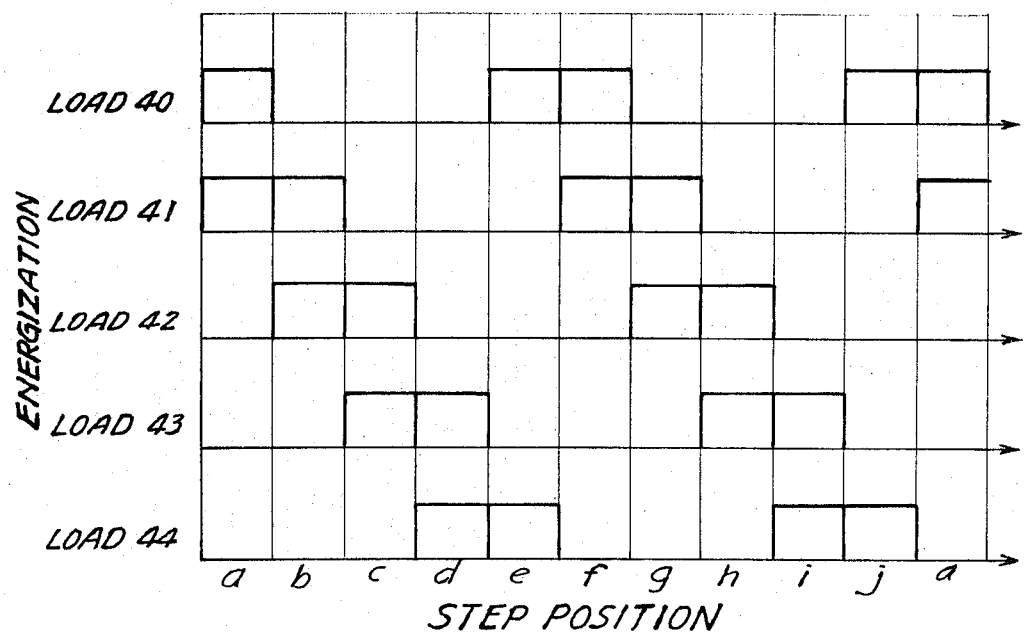
FIG. 8 illustrates energization intervals for the loads energized in accordance with the control system of FIG. 6.

The system for controlling the distribution of electric energy shown and described herein is the subject of a co-pending patent application of Edgar T. Gorman and Donald D. Nelson assigned to Minnesota Mining and Manufacturing Company of St. Paul, Minn., and filed as of the date of this application.

DETAILED DESCRIPTION

This invention is directed to a controlled or programmed system of pulse heating. A preselected quantity of heat is applied throughout a prescribed heating time period by means of a series of heat pulses. Each pulse or "on" interval of time is preset and predetermined and is followed by a preset predetermined "off" interval of time during which no heat is applied. The total heating or cooking period through which the system operates and the preset "on" and "off" time intervals are controlled by a timing device.

The device and system is adaptable to situations where precise and economical heating requirements are desired or necessary. It can be used to heat and cook foodstuffs in fresh or frozen state, reconstitute or reheat precooked foods, and apply heat to delicate foods without scorching or thermal damage. The system can be precisely controlled to apply heat to chemicals or thermally sensitive compositions as the input of thermal energy is predetermined and controlled. For example, such applications might be directed to distillation of drugs and other materials that cannot withstand protracted exposures to elevated temperatures. Various embodiments of the system disclosed herein could be utilized in a multiple of applications which require economical, precise and efficient heating such as hot water heating, home heating, etc.

For exemplary purposes the invention will be described with respect to a system for cooking, heating and/or reconstituting foodstuffs. The system is adaptable to various food preparation requirements. Its light weight, lack of heavy structural parts and ease of cooking a plurality of meals makes the device especially useful for preparing fresh or reconstituted food aboard aircraft, ships, railway dining cars and in restaurants or by catering services. The efficiency and ease of operating the system also makes it adaptable as a domestic cooking unit.

In utilizing the system, it is preferable that the oven or receptacle in which the food is placed for heating and the heating source per se have a low thermal inertia or fast thermal response so that the system operates at comparatively low temperature (the cooking temperature of the food) and passes substantially all of the heat created by the heat source through the receptacle directly into the food. The thermal mass of the food is much greater than the thermal mass of the receptacle. To be effective, the quantity of heat applied by each pulse interval must rapidly pass into the food. There should be no thermal barriers, air films or the like between the heat source and the receptacle or vessel containing the food which might restrict the transfer of heat. For this reason, it is preferred that the heating source comprise a thick film resistor energized by an electric circuit and formed integral with the receptacle containing the food. However, metallic wire resistors, sheath-wire or armored resistors or other conventional electrically energized heat sources may be used provided they are associated with the heating receptacle to produce fast thermal response characteristics. The system may also be designed to utilize heat sources other than electrical energy.

An example of an embodiment utilizing a thick film resistor and which eliminates thermal barriers is schematically shown in FIG. 1. The device comprises a heating chamber or oven generally designated 10 which suitably supports one or a plurality of receptacles or casseroles 11 of desired size. It is preferred that the receptacles be supported in chamber 10 for easy insertion and removal. Each receptacle 11 contains a predetermined quantity of foodstuff 12 which may be in quantities suitable for individual or multiple meal servings in mixed or uniform portions. A cover 13, such as aluminum foil, molded plastic, etc., is placed over the food and receptacle to prevent escape of vapors produced during heating. If desired, a small quantity of water 14 may be added in the bottom of the receptacle increasing vaporization and condensation during heating to promote equable heat transfer throughout the food.

Each receptacle 11 has an integral heating element comprising dielectric layer 15 suitably bonded to the bottom wall of the receptacle and a thick film resistor 16 bonded to the dielectric layer. Layer 15 and resistor 16 extend in thin strips up opposing ends of the receptacle and the resistor terminates in contact tabs 17 for suitably connecting the resistor to a power source. In order to provide fast thermal response and rapid conduction of heat generated by each pulse of electric energy applied to resistor 16, it is preferred that receptacle 11 be made of metal such as 18–20 gauge mild steel having a low heat capacity preferably below 0.002 B.T.U. per degree Fahrenheit per square inch.

Energy for the system is controlled by the timing means schematically shown in FIG. 1 which is suitably connected to a source of electric power. Pulsations of current are supplied to heating element or resistor 16 by means of suitable conductors 18 connected to tabs 17. Current is pulsed to the resistor by means of an electromechanical timing device generally designated 19. Device 19 has three primary components comprising manually set period timer 20 which controls energization of the system for the total heating or cooking time period. A second timer 21, which is manually set to the desired time interval, actuates a series of switches and a relay coil to energize resistors 16 during the pulse or on interval. A third manually set timer 22 controls the duration of the off time interval by actuating a series of switches and a relay coil to de-energize resistor 11 after each on interval. Timers 20–22 can be preset to provide any desired duration of cooking time periods and any combination of on and off time intervals. For example, timers 21 and 22 can be preset to energize and de-energize each tray 11 in simultaneous on and off intervals of desired duration.

In practicing the invention, it is necessary to determine the amount of thermal energy or heat required to heat or cook a given quantity of food so that the required amount of electrical energy (convertible to heat) can be applied during the on intervals in the prescribed heating time period. The amount of heat required to cook a given quantity of food is based upon the capacity of the food to absorb heat until cooked or heated to the desired degree and to a lesser extent upon the heat capacity of receptacle 16. For exemplary purposes the amount of thermal energy required to cook or reconstitute individual meal sized quantities of mixed food in the range of 300 grams per meal (e.g., steak and vegetables) in receptacle 11 is shown in TABLE I. In the example, food was heated and cooked from a frozen state at 0° to 180° F. in a total cooking period of 15 minutes. A total input energy of 208 B.T.U. was applied in 20-second on intervals each followed by a 10-second off interval. 244 watts of power were used during the 15-minute period. The distribution of thermal energy during the various stages of the cooking period is shown in the table. The amount of B.T.U. utilized in each phase of heating was calculated on the basis of converting 10 oz. of ice at 0° to 10 oz. of water at 180° F., the thermal characteristics of the food being nearly the same as water.

TABLE I

| B.T.U. | % of Total B.T.U. | Temperature Range |
|---|---|---|
| 10 | 5% | 0°–32° F. |
| 90 | 43% | Thawing |
| 92 | 44% | 32°–180° F. |
| 16 | 8% | Absorbed by recepticle 11 |
| 208 | 100% | |

The type and quantity of food and desired cooking temperature ranges will determine the amount of thermal energy to be applied during the desired on intervals and the prescribed cooking period. The system herein described efficiently delivers heat quantities in the range of 68 to 430 B.T.U. in prescribed heating or cooking periods of 15 to 25 minutes, the range being sufficient for most cooking applications.

The amount of thermal energy required to cook a given quantity of food by pulse heating can be determined by calculating the amount of heat produced in the desired time intervals with the proper power. The amount of thermal energy supplied to the foodstuffs is substantially proportional to the power applied over a time period. Heat applied in a given cooking or heating time period is a product of the time period multiplied by the power. The amount of energy required to cook various foods can easily be calculated from various tables in the food technology art.

TABLE II shows the necessary input power and resulting heat produced to cook or reconstitute various gram weights of some exemplary staple foods. Pulse heating was applied for a 15-minute-total cooking period in 20-second on intervals each followed by a 10-second off interval. Current from a 110-volt power supply was applied to resistor 16 at the overall average resistance, current and power shown for each quantity of food. Each item was cooked separately from a frozen state.

TABLE II

| Food | Food weight in grams | Average resistance of heating element, ohms | Average amperes | Watts based upon 2/3 energization | B.t.u. used |
|---|---|---|---|---|---|
| Beefstew | 251 | 34 | 2.2 | 162 | 138 |
| Do | 215 | 28 | 2.4 | 176 | 150 |
| Steak | 206 | 30 | 2.4 | 176 | 150 |
| Do | 199 | 30 | 2.4 | 176 | 150 |
| Shrimp | 218 | 40 | 2.1 | 132 | 101 |
| Chicken | 255 | 38 | 2.0 | 147 | 125 |
| Do | 181 | 36 | 2.1 | 154 | 132 |
| Fish | 200 | 35 | 2.4 | 177 | 151 |
| Do | 190 | 40 | 2.0 | 147 | 132 |

An important advantage of pulse heating or cooking, as carried out by this invention, resides in the fact that more heat can be applied to the food without scorching or causing other thermal damage during the total on intervals than can be applied in the same heating time period by applying heat in constant delivery or by controlling the application with thermostats, etc. This is due to the fact that a comparatively high quantity of heat can be applied during the on intervals and each such interval is followed by an off interval during which no heat is applied. The food acts as the major heat sink because of the fast thermal response and low heat capacity characteristics of receptacle 11. Heat applied during each on time interval is uniformly absorbed, diffused and stored in the food during the off time interval so that the temperature of the food per se does not rise above its scorching temperature.

Application of heat in this manner prevents sogginess of uncooked characteristics which are often present when food is cooked from a frozen state by continuous or thermostatic applications of heat at input levels below that which would otherwise cause scorching, etc. Complete diffusion and uniform distribution of heat throughout the food mass resulting from the pulsed cycles allows the food to be cooked precisely as programmed.

For proper cooking or heating, the duration of the on intervals and the amount of heat generated during the total period of heat application must be correlated with the quantity of food. The duration of the on and off intervals is usually constant throughout the total cooking period, but in some applications a variance in the duration of either or both intervals may be desired. As seen in TABLE II, specific foods in various weights were subjected to 20-second on intervals each followed by a 10-second off interval under various power conditions to produce the required amount of heat shown therein.

FIG. 2 of the drawings partially shows a pulse program in which on intervals of 20 seconds were followed by 10-second off intervals. This particular interval program (which was also used in the examples of TABLE II) utilized power supplied to each receptacle 11 from a 110-volt supply of current for an average total heating time period of 15 minutes for heating and cooking individual meal sized portions of staple foods such as meat, starches and vegetables. A program adopting the on and off intervals shown in FIG. 2 was found to be acceptable for simultaneously cooking individual meal portions in several receptacles 11 in total time periods varying from 15 to 25 minutes. Power requirements are relatively low particularly when the time period is increased to 25 minutes.

The pulse interval program of FIG. 2 applied to the example shown in TABLE I applies more heat in the 15-minute time period without scorching, burning or other thermal damage than could be applied in the same time period on a constant or thermostatically controlled basis. Applying the same quantity of heat under constant or thermostatically controlled conditions in the 15-minute period would burn or scorch the food. By pulsing heat in the manner suggested in FIG. 2, the 10-second off interval provides the necessary time for the food to absorb and diffuse the heat prior to the next succeeding on time interval. This process is repeated throughout the prescribed total cooking and heating time period until the food is cooked to the desired state, i.e., absorbs the desired amount of thermal energy.

FIG. 3 shows a typical temperature curve during a portion of a total heating period in which fluctuations of temperature occur during the on and off time intervals. In this particular example, the temperature was sensed by a thermocouple held beneath the food by means of a strip of adhesive at the bottom of receptacle 11 with approximately 244 watts applied for 15 minutes in on intervals of 20 seconds, each followed by 10-second off intervals. Upon initial application of power, the temperature rises rapidly and then begins to level off as a thermal equilibrium is approached. During the approach to equilibrium, the amount of heat applied during each on interval essentially equals the amount of heat absorbed by the food during each on and off interval. For efficient cooking, fluctuations in temperatures at levels approaching thermal equilibrium should be referenced about the boiling point of the fluids in the food or other materials being heated. While not essential, it is preferred that temperatures fluctuate about such point in cycles ranging up to ± 30° F. The boiling point of fluids will vary widely depending upon fats, other organic materials, etc., present in the particular food or material.

Inasmuch as the on and off intervals produce fluctuations in the temperatures at levels referenced about the boiling point of food fluids or water, a refluxing of the fluids occurs. The quantity of heat applied during each on interval momentarily vaporizes some of the moisture present. A substantial amount of vapor produced by each on interval is condensed during the following off interval. Vapor is contained by cover 13. As it condenses to moisture in the area adjacent the cover, heat is transferred by absorption and diffusion, thereby introducing heat into the food. Further, hot condensed liquids are distributed in and around food 12 as the condensed liquid flows to the bottom of receptacle 11. Condensation during off intervals thus tends to evenly distribute and diffuse heat around and within the food and assists in keeping the temperature of the food below its scorching temperature. A further advantage resides in the fact loss of natural juices of the food is minimized thus preserving their original flavor. The transfer of heat upon condensation of the vapor also assists in preventing sogginess when food is cooked from a frozen state.

Attainment of near thermal equilibrium necessary for refluxing is partially due to the fact resistor 16 has a positive temperature coefficient of resistance, a characteristic inherent in many thick film resistors. At cooking temperature ranges approaching equilibrium, such as shown in FIG. 3, resistance of resistor 16 increases sufficiently to automatically lower the amount of heat delivered and required to maintain temperatures at the temperature ranges shown. The resistance and coefficient of resistance between high and low temperature can be controlled by selecting the composition of resistor 16. A change in resistivity ranging from 35 to 50 percent between high and low operating temperatures has been found acceptable for purposes of this invention.

Table III shows measured changes in resistivity of film resistors 16 and the resulting temperature coefficient of resistance of two such resistors selected for the purpose of cooking staple and delicate foods respectively. The changes shown in the table were based upon a temperature range of 70° to 180° as measured on the bottom surface of receptacle 11. The coefficient of resistance, i.e., the fractional change of resistance per degree Fahrenheit of the two resistors measured was found to average approximately 0.0026 per degree Fahrenheit.

TABLE III

| Resistor characteristics | Temperature range measured, °F. | Change in temperature, °F. | Range of resistance in ohms | Change of resistance in ohms | Percent of change of resistance from low to high temperature | Positive coefficient of resistance per °F. |
|---|---|---|---|---|---|---|
| Resistors for cooking and heating staple foods | 70-180 | 110 | 45-60 | 15 | 33 | .00227 |
| Resistors for cooking and heating delicate foods | 70-180 | 110 | 31-46 | 15 | 48 | .00296 |

Since the conversion of electrical energy to thermal energy is substantially 100 percent efficient and the heat absorbed by receptacles 16 is a significantly low percentage due to its fast thermal response characteristics, substantially all heat produced by the system is passed directly into the food 12. The heating or cooking operation can thus be controlled or programmed in various ways.

The quantity of electrical power consumed can be varied to meet the requirements of a particular cooking situation or adjusted to the amount of power available from a particular source. In most food cooking and heating applications using food quantities, such as shown in TABLES I and II, it is preferred the heating elements of the individual receptacles consume power in the range of 150–250 watts at constant voltage. The range is the average of all on intervals throughout the total heating period.

The system is also controlled by resistors 16 of each receptacle 11. The resistance of each receptacle can be correlated with the heat requirements of the food for which it is designed to heat or cook such as the examples of TABLE III. If desired, resistor 16 bonded to the base of receptacle 11 can be designed with varying resistance patterns thus producing differing amounts of heat in specific areas of receptacle 11. Foods requiring different quantities of heat can be cooked in the same receptacle. For example, meats requiring a larger amount of heat would be placed in the receptacle over the portion of resistor 16 producing the greatest quantity of heat. Vegetables or other foods requiring delicate heating would be placed over the portions of resistor 16 producing heat correlated to the heat requirements of such foods. In most applications, the preferred range of resistance has been found to be between 30–60 ohms thus producing temperatures in the range of 180°–220° F. when powered from a 110-volt source. In some cases, it may be desired to increase the resistance so as to produce heat up to 250° F.

Once the power and resistance factors have been fixed and the amount of heat required to heat or cook the food has been determined, the system can be programmed solely by controlling the on and off time intervals and the total time period of cooking or heating. The on-off intervals may be adjusted as desired to the specific heating or cooking situations by manually setting timers 21 and 22. Preferred intervals for cooking small portions of a given food or meal sized food portions packed in individual receptacles 11 have been found to be about 20 seconds for the on interval, each followed by a 10-second off interval. Other applications may require longer intervals. For example, in some applications it has been found advantageous to increase the on intervals to 30 seconds followed by 20-second off intervals, and in others using a 20-second on interval followed by an off interval of up to 30 seconds. Any combination of intervals may be used in a particular application to achieve desired heating or cooking. In applications utilizing a multiple of receptacles 11, the sequential order of on and off intervals applied to each receptacle of the system may be varied so that the system per se draws a relatively constant flow of current from the power source. The preferred total time period for cooking or heating is generally in the range of 8–25 minutes. Total cooking or heating time is adjusted by setting timer 20.

The system is adaptable to provide an indeterminate "hold heating" period. At the conclusion of the total prescribed cooking or heating time, a hold heating period may be used to apply a reduced quantity of heat after cooking to keep the food at desired elevated temperatures throughout an indeterminate period of time so that the food is retained at edible temperatures until served. In such hold heating periods, the duration of the on interval is reduced and the duration of the off interval increased as heat requirements are minimized. Hold heating incorporating on intervals of 2–5 seconds followed by off intervals of 58–55 seconds have been found sufficient to retain the food at edible temperatures throughout an indeterminate hold heating period.

FIG. 4 is a view of a control system used in energizing the resistors 16 of the heating receptacles 11 over a prescribed period of time. FIG. 5 provides a key to the relationship of the switching elements of FIG. 4.

Referring to FIGS. 4 and 5, lines 35 and 36 are for connection to a source of electric power. Power timer 20, on interval timer 21 and off interval timer 22 are electrically powered timers which are energized upon being connected across lines 35 and 36. Switch 23 is a normally closed switch operatively coupled to the period timer 20 to open after the timer has operated for the prescribed heating time. Switch 24 is a normally open switch operatively coupled to the on interval timer 21 to close each time on interval timer 21 completes operating for a predetermined on interval. Switch 24 thereafter remains closed only so long as on interval timer 21 remains energized. Upon interruption of power to on interval timer 21, on interval timer 21 resets and switch 24 is opened.

Switch 25 is a normally closed switch operatively coupled to the off interval timer 22 to open each time the off interval timer 22 completes operating for a predetermined off interval. Switch 25 thereafter remains open only so long as off interval timer 22 remains energized. Upon interruption of power to off interval timer 22, off interval timer 22 resets and switch 25 is closed.

Switch 26 is a safety interlock switch which is closed only when the heating chamber 10 is closed for operation.

Relay coil 27 when energized opens normally closed contacts 28 and closes normally open contacts 29. Relay coil 30 when energized closes normally open contacts 31 and 32.

The control system operates in the following manner. Electric potential is provided across lines 35 and 36 to energize period timer 20, on interval timer 21 and coil 30. The energization of coil 30 closes contacts 31 and 32 and results in energization of loads 33 and 34 such as resistors 16.

Upon on interval timer 21 completing a predetermined interval, switch 24 closes resulting in the energization of off interval timer 22 and coil 27.

Upon the energization of coil 27, contacts 28 are opened and contacts 29 are closed. The opening of contacts 28 de-energizes on interval timer 21 and coil 30. The de-energization of on interval timer 21 resets the on interval timer 21 and opens switch 24. However, flow of current through the off interval timer 22 is not interrupted by opening switch 24 since contacts 29 have been closed to provide an alternative current path. The de-energization of coil 30 opens contacts 31 and 32 and interrupts the energization of the loads 33 and 34 respectively.

Upon off interval timer 22 completing a predetermined off interval, switch 25 opens resulting in the de-energization of coil 27 and of off interval timer 22. The de-energization of coil 27 closes contacts 28 and opens contacts 29. The closing of contacts 28 re-energizes on interval timer 21 and coil 30 to commence another on interval. The de-energization of off interval timer 22 resets the off interval timer 22 and closes switch 25. However, flow of current through switch 25 and the off interval timer 22 is prevented from immediately recommencing since contacts 29 have been opened.

Upon the period timer 20 completing its prescribed interval, switch 23 is opened resulting in the de-energization of both timers 21 and 22 and both coils 27 and 30 thereby terminating the energization of intermittent on and off intervals.

The period timer 20 would be set to allow a sufficient number of on intervals to provide the predetermined quantity of energy to the load.

When properly programmed, the system is highly compatible with power sources which require loads drawing a limited amount of current. For example, if five receptacles 11 are incorporated in a system and each 20-second on interval is followed by a 3-second off interval, power can be programmed in a selective or consecutive order to each of the five receptacles. At any given moment during a cooking or heating period, two of the five receptacles 11 are energized or placed in on intervals and three receptacles de-energized or in off intervals. Thus at a given instant, power would be applied only to two-fifths of all receptacles. Power is thus supplied at an essentially constant rate and the power requirements are therefore less than that of a system in which all five receptacles are energized and de-energized simultaneously. FIGS. 6–9 show three diagrams and an illustration of an electrical distribution control system for energizing five receptacles in programmed sequences of on and off intervals. At any given moment, two receptacles are in on intervals and three receptacles in off intervals. This system is particularly adaptable for cooking a number of meals in situations where electrical power consumption and weight requirements are restricted or limited such as aboard aircraft, ships, railroad trains, etc.

Figure 9:
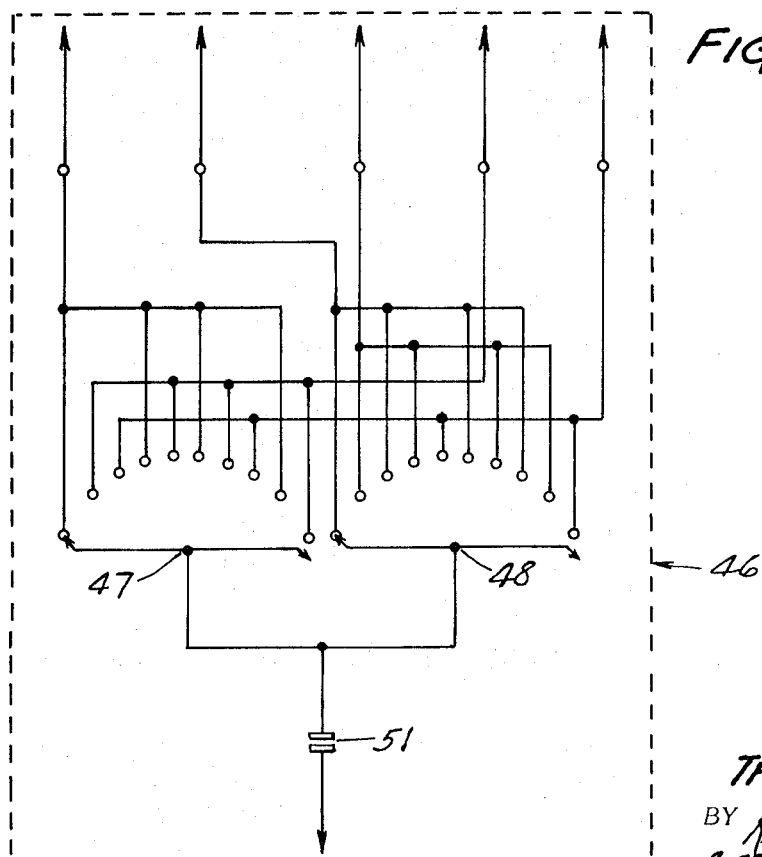
FIG. 9 is an alternative embodiment of that portion of the control system shown in FIG. 6 which is used for predetermining the sequence of energy distributed to the loads. The embodiment of FIG. 9 is for distribution from a single phase source to five loads.

Referring to FIG. 6, an embodiment of the system for controlling distribution of electric energy is shown energizing five loads 40–44 from two phases of a four-wire three-phase power supply. A load contact network 46 is placed between the source and the loads to program the energy distribution essentially equally among the loads over a prescribed period. The loads are connected to various terminals of rotary stepping switches 47 and 48. The rotary stepping switches are energized in response to pulses of the recycle timer circuit 49 to step periodically. Stepping switches 47 and 48 move through positions *a* to *j* simultaneously. In this embodiment, connections between loads 40–44 and rotary stepping switches 47 and 48 are programmed to provide current flow to the loads so that only two loads are energized at any one time and so that each load is energized in a sequence of on for two intervals and off for three intervals. This energization sequence is illustrated in FIG. 8. The load contact network 46 contains relay contacts 50 and 51 on the input lines from the source. The position of the relay contacts 50 and 51 are also controlled by the recycle timer circuit 49. The recycle timer 49 causes the relay contacts 50 and 51 to be closed only during the intervals between the periodic steps of the rotary stepping switches 47 and 48. This prevents arcing between the rotary stepping switch contacts while these switches step. The load contact network 46 connections could be readily modified to also accommodate distribution from single- or three-phase power supplies. A single phase embodiment is shown in FIG. 9. The sequence of the intervals is not restricted to two on and three off as illustrated in FIG. 6 but may be variably selected. An embodiment providing for single step on intervals and an off interval varying between one and two steps is shown in FIG. 9.

The prescribed period over which the loads are to be energized is determined by the component values in the pulse timer circuit 52, the predetermined setting of shorting switch 53 and the interconnection between rotary stepping switch 54 and shorting switch 53. The pulse timer circuit 52 controls the rate at which rotary stepping switch 54 rotates. The interconnection between shorting switch 53 and rotary stepping switch 54 determines the number of times the rotary stepping switch 54 will rotate in response to pulses generated by the pulse timing circuit 52. Responsive to the rotary stepping switch 54 completing its predetermined number of steps, the operation of the recycle timer circuit 49 changes and the mode of energy distribution changes. In the embodiment of the control system illustrated in FIG. 6, the operation of recycle timer 49 changes so as to step rotary stepping switches 47 and 48 less frequently and to close contacts 50 and 51 to allow energization of the loads for an interval which is relatively short both in comparison to the interval between steps and in comparison to the load energization intervals during the first mode of distribution wherein a predetermined quantity of energy was distributed for a prescribed period. The circuit remains in the second mode for distributing less frequent energization until the control system is either turned off or reset to its first mode. The rate of energy distribution to the loads during the second mode can be set to compensate for any energy dissipation from the load following the completion of the first mode of distribution. The second mode connections can also be programmed to place the recycle timer in an indeterminate switching cycle, and thereby in effect turn off distribution of energy to the load. Thus the second mode of distribution can be, in effect, an "off" mode. The embodiment for changing modes of distribution can be used in the pulse cooking and heating system to provide energy pulses to keep the food warm after cooking has been completed.

In the embodiment shown in FIG. 6, the control system is energized from the neutral and one phase of the lines leading from the power source to the load. Thus if the power source is temporarily interrupted, the recycle timer circuit 49 and pulse timing circuit 52 will also be interrupted in their sequence. Both are capable of resuming operation without having to be reset at the beginning thereof and are thus capable of in effect remembering how much energy has been distributed to the load so as not to provide more than the predetermined quantity, although the prescribed period is temporarily interrupted.

The operation of the control system shown in FIG. 6 will best be understood by detailed consideration of its various components. Safety interlock switch 55 must be closed to energize the control system. When safety interlock switch 55 is open, relay contacts 50 and 51 receiving no actuation from recycle timer circuit 49 remain open and no current flows to the loads 40–44.

Rectifier bridges 56 and 57 and transformer 58 provide two levels of DC voltage for the control system.

The mode of distribution is selected by positioning the progressive shorting switch 53. Progressive shorting switch 53 is ganged with recycle timer switches 59 and 60, switch 61 and off-on switch 62, so that all five switches move from position *a* through *i* simultaneously.

Rotary stepping switches 47 and 48 step simultaneously when sufficient current flows through coil 63. Normally closed interrupter contacts 64 open after coil 63 has caused switches 47 and 48 to step. Resistor 65 maintains a lower level of current flow through coil 63 to keep the coil 63 from being overheated. Normally closed relay contacts 66 open when sufficient current flows through recycle timer coil 67. Sufficient current through recycle timer coil 67 also closes load contact network relay contacts 50 and 51.

Current through pulse timer coil 68 closes normally open relay contacts 69.

Current through coil 70 steps rotary stepping switch 54 and opens normally closed interrupter contacts 71. Switch 45 is connected to the rotating mechanism of rotary stepping switch 54. It is opened when rotary stepping switch 54 is in position *a* and is closed when rotary stepping switch 54 is in position *b–z*.

Current through relay coil 72 closes normally open relay contacts 73 and opens normally closed relay contacts 74. Current through relay coil 72 also closes normally open recycle timer contacts 75 and opens normally closed recycle timer relay contacts 76.

Diode 77 protects relay contacts 66 by dissipating any transient voltage induced in coil 63 when current through coil 63 is interrupted.

Varistor 78 dissipates transient voltages induced in coil 70 when current through coil 70 is interrupted.

Capacitor 79 filters the ripple from the DC voltage supplied from rectifier bridge 57.

In the pulse timer circuit 52, resistors 80 and 81 and potentiometer 82 provides a voltage dividing network for connection to the gate of a programmable unijunction transistor 83. Resistor 84 and capacitor 85 are chosen to predetermine the interval at the programmable unijunction transistor 83 pulses to deliver current through coil 68.

The pulse timer circuit 52 provides a stepping pulse at predetermined periodic intervals to the timer stepping switch 54. A stepping switch was chosen for the timer because it would maintain its position in the event of power interruption and because of the ease in changing and selecting different timing intervals.

The recycle timer circuit 49 is required to provide programmable energization and switching intervals times for distribution of electric energy to the load. A positive on or off condition is provided by a pair of transistors 86 and 87 connected with positive feed-back to make a bistable circuit. Resistors 88 and 89 provide a biasing voltage on the base of the transistors 86 and 87 respectively. Resistor 90 provides a bias on the common emitter terminals of the transistors 86 and 87. When transistor 86 is turned on, the bias current through resistor 104 is cut off so transistor 87 is cut off, which in turn provides adequate bias current through resistor 110 to maintain the transistor 86 in the full conduction state. Transistor 87 can be made to conduct by application of an external bias current, whereupon the conducting transistor 86 (in the absence of an external signal) will be turned off.

The recycling of the bistable circuit requires momentary external bias currents at a predetermined interval of time to control the continuous on-off cycling. The timing is done by a resistance-capacitance (RC) circuit, and the required pulse of external bias current is derived by the discharge of the capacitor 99 or 105 through a programmable unijunction transistor 91 or 92 into the base of transistor 86 or 87. Programmable unijunction transistors 91 and 92 are connected to alternately deliver pulses to the base terminals of transistors 86 and 87 respectively. Resistors 93 and 94 and potentiometer 95 provide a voltage dividing network for connection to the gate of programmable unijunction transistor 91. Resistors 96 and 97 and potentiometer 98 provide a voltage dividing network for connection to the gate of programmable unijunction transistor 92.

Two RC circuits and programmable unijunction transistors 91 and 92 provide the pulsing to control the recycle timer circuit 49. The timed pulsing of programmable unijunction transistor 91 is initiated when the collector voltage of the transistor 86 rises and provides charging current through the connected timing resistor, 100, 101, 102 or 103. When the voltage across the capacitor 99 at the anode of programmable unijunction transistor 91 is about 0.6 volt higher than the voltage of the programmable unijunction transistor 91 gate, the programmable unijunction transistor 91 turns on and effectively connects capacitor 99 to the base of transistor 86 to turn transistor 86 on. The other transistor 87 then is turned off and the timed pulsing of the other programmable unijunction transistor 92 circuit is initiated to turn the transistor 87 back on after a period of time determined by the values of the timing resistor 106, 107, 108 or 109, and capacitor 105 and the voltage level of the programmable unijunction transistor 92 gate. Potentiometers 95 and 98 are used to adjust the gate voltages of programmable unijunction transistors 91 and 92 to compensate for the deviation of the capacitance values of capacitors 99 and 105 from the nominal values.

The different timing resistors 100-103 and 106-109 in the recycle timer circuit 49 allow the operator to choose different energization and switching cycle times which controls the duration and frequency of electrical energy distribution to the load.

With switches 53 and 59-62 in positions $a$, the control system is off except when the stepping switch 54 is self-stepping to the starting position. Thus the jumper from position $a$ of recycle timer switch 60 to the emitter prevents the transistor circuit from allowing current through relay coil 67. With recycle timer switches 59 and 60 in positions $b$ and $c$, the timing resistors are chosen for different predetermined energization and switching intervals for the second mode of distribution. In the remaining six positions, $d-i$, the energization and switching cycles are predetermined for a first mode of distribution while relay coil 72 is energized, and for a second mode of distribution when the prescribed period is elapsed and relay coil 72 is not energized. The prescribed period in each of the last six positions, $d-i$, is different and is controlled by the setting of progressive shorting switch 53.

Resistor 111 is a load resistor for transistor 87 whereas diode 112 protects transistor 86 against transient voltages induced in the recycle timer circuit. Cooking lamp 113 lights while the recycle timer is in its first mode of distribution and ready lamp 114 lights while the circuit is in its second mode of distribution. Used with the pulsed cooking and heating system, light 113 would show that food was cooking and light 114 would show that the food was done.

To place the control system in its first mode of distribution, the progressive shorting switch 53 is rotated to short out contacts $a-d$. The rotation of progressive shorting switch 53 in turn rotates recycle timer switches 59 and 60, switch 61 and on-off switch 62 to position $d$. Rotary stepping switch 54 begins in position $a$. The control system is energized by closing safety interlock switch 55. Assuming transistor 86 first conducts, sufficient current will flow through relay coil 67 to close relay contacts 50 and 51 in order to allow current to the loads 40-44. Also, in response to sufficient current through relay coil 67, relay contact 66 opens to terminate current through relay coil 63. Upon transistor 86 being rendered conductive, a current is also conducted through resistor 107 which commences the RC time for building up sufficient potential at the anode of programmable unijunction transistor 92 to discharge capacitor 105 to the base of transistor 87 to turn transistor 87 and transistor 86 off. When transistor 87 conducts and transistor 86 is nonconductive, the current through coil 67 drops to open relay contacts 50 and 51 in order to prevent currents to loads 40-44, and to close relay contacts 66 to allow current through interrupter contacts 64 and coil 63. Initially, current flows through coil 63 at a first level of sufficient magnitude to rotate stepping switches 47 and 48. However, in response to the flow or current through coil 63, interrupter contacts 64 drop open and the flow of current to coil 63 is rerouted through resistor 65 which is of sufficient magnitude to reduce the current through coil 63. The smaller current through coil 63 reduces heat dissipation in coil 63, but yet is sufficient to maintain interrupter contacts 64 in an open position.

Upon the progressive shorting switch 53 and switch 61 being rotated to position $d$, current flows through coil 72. In response to current flowing through coil 72, relay contacts 73 and 75 are closed and relay contacts 74 and 76 are opened. The closing of contact 73 allows current to flow through the pulse timer circuit 52. In accordance with the selected RC values of the pulse timer circuit, programmable unijunction transistor 83 will deliver a pulse of current periodically through relay coil 68 which flow of current through relay coil 68 closes normally open relay contact 69 which allows the flow of current through coil 70. Upon current flowing through coil 70, the rotary stepping switch 54 rotates. Thus, for each pulse of the pulse timer circuit 52, rotary stepping switch 54 rotates one position. With progressive shorting switch 53 in position $d$, upon rotary stepping switch 54 rotating to position $j$, the flow of current to relay coil 72 through progressive shorting switch 53 is interrupted. Thereupon, relay contacts 73 and 75 will open and relay contacts 74 and 76 will close. The opening of relay contacts 73 ceases the operation of the rotary stepping switch 54. The opening of relay contacts 75 and the closing of relay contacts 76 changes the RC configurations related to transistors 86 and 87 so as to change the timing cycles of recycle timer circuit 49 to be in accordance with a second mode of distribution. Recycle timer circuit 49 will thereafter continue to operate in accordance with this second mode of distribution until the control system is de-energized. In the second mode of distribution just as in the first, the flow of sufficient current through coil 67 closes load contact network relays 50 and 51 and opens relay contacts 66 to terminate flow of current through coil 63. Upon current flow through coil 63 ceasing, the interrupter contacts 64 will again close.

The recycle timer circuit 49 operates in accordance with the so-called second mode of distribution initially if the progressive shorting switch 53 is positioned in either position $b$ or $c$ which positioning will also cause recycle timer switches 59 and 60, switch 61 and on-off switch 62 to be positioned in position $b$ or $c$. The total duration for the first mode of distribution can be prescribed by positioning the progressive shorting switch in positions $d-i$.

Upon completion of the prescribed period for the first mode of distribution rotary stepping switch 54 stops short of position $a$. To reset rotary stepping switch 54, shorting switch 53 is positioned in position $a$. This rotation causes the associated switches 59 through 62 to also be positioned in position $a$. With recycle timer switches 59 and 60 in position $a$, recycle timer circuit 49 does not function to close load network contacts 50 and 51, hence no power can be delivered to the load and no current can pass through relay coil 72. Thus, the pulse timer circuit 52 cannot function. However, current does not pass through interrupter contacts 71 and coil 70. Although switch 62 is open, switch 45 is closed since rotary stepping switch 54 is in a position other than position $a$ and a voltage is therefore available across coil 70. Current is allowed to flow through switch 61, interrupter coil 71 and coil 70. The flow of current through coil 70 rotates stepping switch 54 one position and opens interrupter contacts 71. Upon interrupter contacts 71 being opened, current flow through coil 70 ceases and interrupter contacts 71 again close to allow current to again flow through coil 70 to step rotary stepping switch 54 an additional position. However, upon rotary stepping switch 54 reaching position $a$, switch 45 opens and the control system is de-energized thereby preventing further rotation of stepping switch 54.

This control system can be used with the pulse cooking and heating system. In one embodiment, power is provided from a three phase, four wire, 400-Hz, 200-V AC supply through the load contact network 46 to five resistively heated casseroles. The power drawn from one phase and neutral and fed to the control circuit is rectified by bridge 56 to supply 115 V DC.

Bridge 57 receives power from step-down transformer 58. The output of bridge 57 supplies approximately 28 V DC power and is filtered by capacitor 79 to reduce ripple. The total cooking time was selected by positioning progressive shorting switch 53 to cut out through from four to nine of positions a-j, of rotary stepping switch 54 the shortest cooking duration being when only positions a-d where shorted out and the longest cooking duration being when positions a-j were shorted out. Indicator light 113 is on while cooking is in progress. Upon completion of the prescribed cooking interval, the recycle timer of the control system operates in accordance with the second mode of distribution to provide only sufficient energy to keep the casseroles warm until they are removed from the oven. Also, upon the prescribed interval being completed, cooking lamp 113 goes out and ready light 114 comes on.

With the embodiment shown in FIG. 6, energy was supplied in the pulse sequences shown in FIG. 8, so that each casserole was heated for approximately 20 seconds and then not heated for approximately 30 seconds. The total cooking time ranged from 9 minutes with progressive shorting switch 53 in position d to 25 minutes with progressive shorting switch 53 in position i. Positions b and c provide different modes of distribution for keeping food warm, the difference being that energy is delivered to any load for approximately 1½ second each 63¾ seconds for position b and for 2½ seconds each 67½ seconds for position c. The stepping switches 47 and 48 step once per 12¾ seconds in position b and once for 13½ seconds in position c. For position b of recycle timer circuit switches 59 and 60, the energization and switching intervals are predetermined to be three-fourth and 12 seconds respectively. For position c, they are predetermined to be 1¼ and 12 seconds respectively. In positions d through i, they are 10 and one-half seconds respectively during the first mode of distribution and are 1 and 12 seconds respectively during the second mode of distribution following the opening of contacts 75 and the closing of contacts 76. The pulse timer circuit, 52, delivers current pulses approximately once per minute.

In this specific embodiment, components of the following value or manufacture were used:

| | |
|---|---|
| Resistor 65 | 500 Ω |
| Resistor 80 | 10 kΩ |
| Resistor 81 | 27 kΩ |
| Resistor 82 | 25 kΩ |
| Resistor 84 | 1.3 MΩ |
| Resistor 88, 89 | 8.2 kΩ |
| Resistor 90 | 27 Ω |
| Resistor 93, 96 | 15 kΩ |
| Resistor 94, 97 | 39 kΩ |
| Resistor 95, 98 | 25 kΩ |
| Resistor 100, 102, 103 | 560 kΩ |
| Resistor 101 | 22 kΩ |
| Resistor 104, 110 | 3.9 kΩ |
| Resistor 106 | 470 kΩ |
| Resistor 107 | 47 kΩ |
| Resistor 108 | 82 kΩ |
| Resistor 109 | 39 kΩ |
| Resistor 111 | 300 Ω |
| Capacitor 79 | 4700 μf |
| Capacitor 85 | 47 μf |
| Capacitors 99, 105 | 22 μf |
| Transistors 83, 91, 92 | Programmable Unijunction Transistor Type D13T2 manufactured by the General Electric Company of Syracuse, New York |
| Transistors 86, 87 | PNP Transistor Type 2N3404 manufactured by the General Electric Company of Syracuse, New York |
| Diodes of rectifier bridge 56, diode 77 | Rated at 2A/400PIV |
| Diodes of rectifier bridge 57, diode 112 | Rated at 2A/100PIV |
| Transformer 58 | Rated at 115/18 V single phase 60/400 Hz, 20 VA |
| Recycle timer relay represented by coil 67, contacts 50, 51, 66 | Relay, Model 110-4442 manufactured by the Ward Leonard Company of Mount Vernon, New York |
| Stepping switch represented by coil 63, stepping switches 47, 48, contact 64 | Step Switch Model 250-384-046 manufactured by the Ledex Company of Dayton, Ohio |
| Relay represented by coil 68, contact 69 | Relay Model W102RMPCX-manufactured by the Magnecraft Company of Chicago, Illinois |
| Stepping switch represented by coil 70, switch 45, contact 71, rotary stepping switch 54 containing varistor 78 | Step Switch, Model RM-95V manufactured by Automatic Electric Company of Northlake, Illinois |
| Relay represented by coil 72, contacts 73, 74, 75, 76 | Relay Model CR120G20303 manufactured by the General Electric Company |
| Switch assembly containing switches 53, 59, 60, 61, 62 | Switch Assembly manufactured by Centralab, Division of Globe Union of Milwaukee, Wis. Model PA-301 shaft and a Model PA-12 progressive shorting section for switch 53, three Model PA-0 sections for switches 59, 60 and 61 and one model PA-1 section for switch 62 |

The system has definite advantages over conventional heating and cooking systems which utilize constant or thermostatically controlled applications of heat. More heat can be pulsed into the food during the on intervals in a given time period, thus the system can cook or reconstitute a given quantity of food in less time than by conventional methods. The amount and rate of heat input can be precisely metered by controlling power, resistance and/or time thus there is no danger of thermal damage to heat sensitive foods or other similar materials being heated. Inasmuch as resistor 16 is integrally bonded to receptacle 11, the latter having a low heat capacity, nearly all of the heat produced by resistor 16 is rapidly passed into food 12. The fast thermal response characteristics of the system make it highly efficient in operation and additionally allows the system to operate at much lower temperatures than conventional ovens as there are no thermal barriers to overcome. Heat passes directly from its source to the food. The positive temperature coefficient of resistance of resistor 16 results in an increase in resistance and decrease in power consumption as the system progresses toward cooking temperatures. Fluctuations in temperatures produced by the on and off intervals when in the near equilibrium range allow moisture vaporized during on intervals to be condensed in off intervals thereby refluxing natural moisture and transferring heat to the food. The system is programmed by controlling on and off intervals or pulses according to preset predetermined time intervals over a total prescribed period of cooking time. The system can also be programmed to pulse heat a number of cooking or heating receptacles during controlled intervals throughout the cooking period making the invention adaptable to a variety of applications.

What is claimed:

1. A programmed cooking device capable of applying a preselected quantity of heat in a series of pulsations to a preselected quantity of food in a prescribed time period, said device comprising: a reusable receptacle for containing said food having an integral electric heating element bonded with an insulating layer to the receptacle, the receptacle having a low heat capacity to allow substantially all of the heat generated by the heating element to pass through the receptacle into said food; a circuit for energizing said heating element; and timing means connected to said circuit for alternately energizing and de-energizing said element respectively in programmed discrete preset on intervals each in the range of about 20 to 30 seconds and programmed discrete preset off intervals each in the range of about 10 to 30 seconds, said discrete preset on and off intervals applied alternately and continuously throughout said prescribed time period, the amount of energy cumulatively applied during said on intervals capable of supplying said quantity of heat in said prescribed time period to said food to cook same and each of said off intervals providing with each of said on intervals a period of time for the heat applied to said food by each of said on intervals to diffuse therein and prevent degradation effects to said food from the heat applied by each of said on intervals.

2. A device for cooking and heating a preselected quantity of food by means of a series of heat pulsations comprising:
 a. a plurality of receptacles for containing said food, the receptacles having a heat capacity of less than 0.002 B.T.U. per degree Fahrenheit per square inch;
 b. electric heating element means associated with each receptacle having a dielectric layer bonded to said receptacles and a thick film resistor bonded to said layer;
 c. a circuit connected to said resistors for energizing same;
 d. first timing means connected to and controlling aid circuit for energizing said resistors in predetermined on intervals of time;
 e. second timing means connected to and controlling said circuit for de-energizing said resistors in predetermined off intervals of time and in alternate order with said on intervals; and
 f. third timing means connected to said circuit and adapted to energize said first and second timing means throughout a prescribed period of time and an indeterminate hold heating period of time.

3. The device of claim 2 in which the resistor of said element has a positive temperature coefficient of resistivity of about 0.0026 per degree Fahrenheit.

4. The device of claim 2 in which said on intervals of time throughout said prescribed period are in the range of 20–30 seconds duration and said off intervals of time throughout said prescribed period are in the range of 10–30 seconds duration.

5. The device of claim 2 in which said on intervals of time throughout said indeterminate hold heating period are in the range of 2–5 seconds duration and said off intervals of time throughout said indeterminate hold heating period are in the range of 58–55 seconds duration.

6. The device of claim 2 in which said prescribed period of time is in the range of about 8–25 minutes.

7. A method of applying a preselected quantity of heat to a preselected quantity of food in a prescribed period of time comprising:
 a. placing a preselected quantity of food in receptacles, the receptacles having a film resistor and insulating layer integrally bonded thereto and a heat capacity of less than 0.002 B.T.U. per degree Fahrenheit per square inch to allow substantially all of the heat produced by the resistor to pass through the receptacles into the food;
 b. energizing the resistor of selected receptacles with electric energy, the energy supplied to the resistor of selected receptacles being in discrete on intervals, each of predetermined duration and each applying a defined amount of electric power in the range of about 132 to 244 watts;
 c. de-energizing the resistor of said selected receptacles after the completion of each on interval in discrete off intervals, each of predetermined duration;
 d. alternately energizing and de-energizing the resistor of said selected casseroles in said on and off intervals continuously throughout said prescribed period of time, the heat applied during the on intervals being absorbed by the food during the on and off intervals and the alternate energizing and de-energizing of the resistor of said selected receptacles providing a fluctuation of temperature levels about the boiling point of the fluids in said food in the range of ±30° F. from said boiling point substantially throughout said prescribed period of time.

8. The method of claim 7 wherein said on intervals of time for energizing said resistor are each in the range of about 20 to 30 seconds and said off intervals of time for de-energizing said resistor are each in the range of about 10 to 30 seconds.

9. The method of claim 7 wherein said prescribed period of time for energizing and de-energizing said resistor is in the range of 8 to 25 minutes.

10. A device to cook a preselected quantity of food with a preselected quantity of heat in a prescribed period of time and maintain the food at elevated temperatures after cooking comprising:
 a. a plurality of receptacles for containing food;
 b. a film resistor having a defined resistance to produce said quantity of heat during said period of time and an insulting layer integrally bonded to each receptacle, the receptacles each having a heat capacity of less than 0.002 B.T.U. per degree Fahrenheit per square inch to allow substantially all of the heat generated by the resistor to pass through the receptacle into the food;
 c. an electric circuit to connect the resistor of each receptacle to a source of electric energy; and
 d. a timing circuit interconnected with said circuit having switching means to energize the resistor of selected receptacles in discrete on intervals, each of predetermined duration to apply a defined amount of electric power to the resistor, and de-energize the film resistor of said selected receptacles in discrete off intervals after the completion of each on interval, the off intervals, each of predetermined duration, the switching means energizing and de-energizing the resistors of said receptacles in said on and off intervals continuously throughout said prescribed period of time and the timing circuit further having switching means to alternately energize and de-energize the resistor of said selected receptacles in discrete predetermined on intervals, each of 2 to 5 seconds duration and off intervals each of 55 to 58 seconds duration during an indeterminate period of time after the completion of said prescribed period of time.

11. A device for applying a predetermined quantity of heat in a prescribed cooking time to a predetermined quantity of food comprising:
 a. heating elements having a defined resistance to produce said predetermined quantity of heat in said prescribed cooking time;
 b. circuit means connected to said heating elements;
 c. timing means to control the electrical energy to said heating elements in alternating discrete predetermined on and off intervals, each on interval supplying a defined amount of electric power to said resistor, the cumulative power supplied to the resistor by said on intervals during said prescribed cooking time being sufficient to be converted by said resistor to said predetermined quantity of heat, each off interval providing an interval of time following each on interval in order that substantially all of the heat supplied to the food during each on interval is absorbed by the food throughout the duration of each discrete on and off interval; and
 d. a plurality of receptacles, each associated with one of said heating elements to contain said food, each receptacle having a low heat capacity to allow substantially all of the heat produced by said resistor during each on interval to pass through the receptacle into the food.

12. The device of claim 11 in which the resistance of said resistor is in the range of about 30 to 60 ohms.

13. The device of claim 11 in which the amount of electric power applied during each on interval is in the range of about 132 to 244 watts.

14. The device of claim 11 in which the heat capacity of each of said receptacles is less than 0.002 B.T.U. per degree Fahrenheit per square inch.

15. A device for cooking a predetermined quantity of food with a predetermined quantity of heat by means of programmed pulsed intervals of electric energy comprising:
 a. a plurality of receptacles each having an electric resistor of defined resistance to produce said predetermined quantity of heat in a prescribed period of time;
 b. circuit means connected to the resistor of each of said receptacles;
 c. timing means connected to said circuit to supply electric energy to the resistor of a selected one or more of said receptacles in discrete predetermined pulses continuously throughout said prescribed period of time, the pulses programmed to apply a defined amount of electric power to the resistor during each pulse, the cumulative electric power supplied by said pulses during said prescribed period of time converted by said resistor into said predetermined quantity of heat; and d. timing means to switch off the supply of electric energy to the resistors in discrete predetermined off intervals following each discrete pulse, each off interval and each pulse being programmed to provide an interval of time during which heat applied to the food by the resistor in response to the defined amount of electrical power of each pulse is substantially absorbed by the food.

16. A method of metering a predetermined quantity of heat into a defined quantity of food in programmed predetermined pulsed intervals throughout a prescribed time period comprising:

a. placing food in receptacles, each having a heating element of defined electric resistance to produce said defined quantity of heat in said prescribed cooking time, said receptacle having a heat capacity of less than 0.002 B.T.U. per degree Fahrenheit per square inch to pass substantially all of the heat generated by the element through the receptacle into the food;

b. energizing the heating element of selected receptacles in discrete predetermined on intervals throughout said prescribed time period with a defined amount of electric power applied during each on interval to produce a defined quantity of heat, the cumulative amount of heat produced by said resistor by means of said on intervals throughout said prescribed time period equaling said predetermined quantity of heat; and c. de-energizing the heating elements of said receptacle in discrete predetermined off intervals following each on interval, the duration of each on interval together with each off interval providing an interval of time during which the defined quantity of heat applied during each on interval is substantially absorbed by the food.

17. The method of claim 16 wherein the total amount of heat produced by said resistor during said prescribed period of time is the range of 68 to 430 B.T.U.

* * * * *

UNITED STATES PATENT OFFICE
CERTIFICATE OF CORRECTION

Patent No. 3,666,921  Dated May 30, 1972

Inventor(s) THOMAS S. SHEVLIN

It is certified that error appears in the above-identified patent and that said Letters Patent are hereby corrected as shown below:

Col. 2, line 2:    "pulses" should be
                                    -- pulsed --

Col. 8, line 42:   "3-second" should be
                                      -- 30 second --

Col. 13, line 5:   "cut out" should be
                                      -- short out --

Col. 14, line 4: "W102RMPCX-" should be
                                      -- W102RMPCX-3 --

Col. 15, line 12,
      claim 2:        "aid" should be -- said --

Signed and sealed this 26th day of December 1972.

(SEAL)
Attest:

EDWARD M. FLETCHER, JR.                ROBERT GOTTSCHALK
Attesting Officer                           Commissioner of Patents